(United States Patent Office)

3,520,918
Patented July 21, 1970

3,520,918
p-NITROPHENYL-p'-GUANIDINOBENZOATE HCl
Theodore Chase, Jr., Center Moriches, and Elliott N. Shaw, Shoreham, N.Y., assignors to the United States of America as represented by the United States Atomic Energy Commission
No Drawing. Filed Mar. 8, 1968, Ser. No. 711,529
Int. Cl. C07c 129/08
U.S. Cl. 260—471    1 Claim

ABSTRACT OF THE DISCLOSURE

A novel composition of matter p-nitrophenyl-p'-guanidinobenzoate HCl which is useful as a titrant to determine the concentration of trypsin, thrombin and plasmin activity.

PRIOR ART

Studies on the relations between structure and activity in the enzyme trypsin, which are currently proceding in a number of medical and biological laboratories, have been hampered by autodigestion or denaturation which make it difficult to secure and maintain fully active preparations. Furthermore, the isolation of active forms of trypsin which differ considerably in their esterase and amidase activities indicates that use of conventional rate assay techniques to establish the purity of trypsin is not desirable. Specific titration procedures have many advantages over rate assays in determining the concentration of solutions of hydrolytic enzymes.

SUMMARY OF THE INVENTION

The invention described herein was made in the course of, or under a contract with the U.S. Atomic Energy Commission.

We have discovered a novel composition of matter, p-nitrophenyl-p'-guanidinobenzoate HCl (hereinafter referred to as NPGB·HCl) which is useful as a titrant to determine the concentration of trypsin, thrombin and plasmin activity.

DETAILED DESCRIPTION OF THE INVENTION

The NPGB·HCl of our invention can be readily prepared by reacting stoichiometric portions of p-guanidinobenzoic acid HCl, dicyclohexylcarbodiimide and p-nitrophenol in a solvent 1:1 part by volume pyridine:dimethylformamide at room temperature. Dicyclohexylurea crystals are removed from the reaction mass by filtration and the solvent remaining in the mass is removed by the application of a vacuum at ambient temperature. The residue is then taken up in 0.1 N HCl and the slurry extracted three times with aliquots of ethyl acetate, separating the phases by centrifugation. Collection by filtration of the solid from the aqueous phase and recrystallization of the solid from glacial acetic yield NPGB·HCl which is suitable for use as a titrant, though only 92–94% pure by measurement of the p-nitrophenoxide produced on hydrolysis in 0.1 N NaOH. A purer product may be obtained if desired by dissolving the extracted slurry in t-amyl alcohol, saturating the solution with 0.1 N HCl and extracting twice with 0.1 N HCl to remove free p-guanidinobenzoic acid. The t-amyl alcohol solution is then filtered, evaporated to dryness, and the residue crystallized from glacial acetic acid; yield 68–72%, having a purity of 98–99%, based on the amount of p-nitrophenoxide produced upon hydrolysis in 0.1 N NaOH.

EXAMPLE p-Nitrophenyl-p'-guanidinobenzoate HCl was synthesized as follows: p-guanidinobenzoic acid HCl (1.075 gr.), dicyclohexylcarbodiimide (1.083 gr.) and p-nitrophenol (0.725 gr.) were dissolved in 15 ml. of 1:1 by volume pyridine:dimethylformamide solvent and let stand overnight at room temperature. After filtering off dicyclohexylurea, the solvent was removed in vacuo. The residue was taken up in 25 ml. 0.1 N HCl and the slurry extracted three times with 25 ml. aliquots of ethyl acetate, separating the phases by centrifugation. Collection by filtration of the solid from the aqueous phase and recrystallization from glacial acetic acid yielded a product suitable for use as titrant, though only 92–94% pure by measurement of the p-nitrophenoxide produced on hydrolysis in 0.1 N NaOH. A purer product was obtained by dissolving the extracted slurry in 300 ml. t-amyl alcohol, saturating the solution with 0.1 N HCl and extracting twice with 0.1 N HCl to remove free p-guanidinobenzoic acid. The t-amyl alcohol solution was then filtered, evaporated to dryness, and the residue crystallized from glacial acetic acid; yielding 98–99% of the expected amount of p-nitrophenoxide on hydrolysis. The initial optical density at 410 m$\mu$ of a $10^{-4}$ M solution, pH 8.3, was 0.002 to 0.015, indicating a content of free p-nitrophenol not greater than 0.1–0.9% (because of the probable presence of traces of free nitrophenol, it cannot be determined whether the ester has any absorbance of its own at 410 m$\mu$).

*Analysis.*—By standard methods calculated for

(M.W. 336.74) (percent): C, 49.33; H, 3.89; N, 16.63; Cl, 10.52. Found (percent): C, 49.70; H, 4.16; N, 16.19; Cl, 10.37.

The compound showed some discoloration and decompositions at about 260°, but did not melt up to 300° except when heated rapidly.

The NPGB·HCl thus produced was then used as a titrant to determine the concentration of trypsin activity. An aliquot of trypsin solution (in $10^{-3}$ M HCl, 0.02 M in $CaCl_2$) is diluted with 0.1 M veronal buffer (0.1 M sodium barbital acidified with conc. HCl) having a pH of 8.3, 0.02 M in $CaCl_2$, to give 0.99 ml. of $1$–$5\times10^{-5}$ M trypsin. This sample was placed in a 1 ml. cuvette which is placed in the sample cell position of a double beam recording spectrophotometer and the instrument was balanced against a reference cell containing the same buffer.

Ten $\mu$l. of a 0.01 M solution of NPGB·Cl in dimethylformamide is added to the reference cuvette, the contents mixed and the cell replaced in the instrument; the same procedure is followed with the sample cuvette and the instrument turned on. The optical density is followed long enough to permit extrapolation to zero time, if necessary, and the burst of p-nitrophenol calculated: optical density $\times 6.025 \times 10^{-5}$=molarity of nitrophenol produced=molarity of active trypsin present. In a typical titration of a solution of $\alpha$-trypsin, NPGB·HCl titration of three aliquots indicated the molarity of active trypsin to be $5.12\pm0.08\times10^{-4}$ M or $84.6\pm1.4$% pure.

The synthesis of NPGB·HCl is not difficult; the dry compound is completely stable and dimethylformamide solutions are usable for at least four weeks if stored at 4° C.; the solubility in water (saturated solution of 0.1 M veronal, pH $8.3=9\times10^{-4}$ M) is quite sufficient for titration.

We claim:
1. The compound which is p-nitrophenyl-p'-guanidinobenzoate HCl.

References Cited

UNITED STATES PATENTS 3,406,170   10/1968   Papa _____ 260—471

LORRAINE A. WEINBERGER, Primary Examiner

L. A. THAXTON, Assistant Examiner